United States Patent
Adams, Jr. et al.

(10) Patent No.: US 6,621,937 B1
(45) Date of Patent: Sep. 16, 2003

(54) REMOVING CHROMA NOISE FROM DIGITAL IMAGES BY USING VARIABLE SHAPE PIXEL NEIGHBORHOOD REGIONS

(75) Inventors: James E. Adams, Jr., Rochester, NY (US); John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/415,374

(22) Filed: Oct. 8, 1999

(51) Int. Cl.⁷ .................................................. G06K 9/40
(52) U.S. Cl. ........................................ 382/275; 382/205
(58) Field of Search ................................. 382/205, 260, 382/261, 275, 282, 283

(56) References Cited

U.S. PATENT DOCUMENTS 5,845,017 A  * 12/1998  Keyes ........................ 382/275
6,108,455 A  *  8/2000  Mancuso ..................... 382/275
6,278,804 B1 *  8/2001  Okuyama .................... 382/275

FOREIGN PATENT DOCUMENTS

WO    WO 99/30547    6/1999

* cited by examiner

*Primary Examiner*—Phuoc Tran
(74) *Attorney, Agent, or Firm*—Raymond L. Owens

(57) ABSTRACT

A method for removing noise on a pixel by pixel basis from pixels of a digital image is disclosed. The pixels are used to produce a map of features, which then are used to produce a variable shape neighborhood region of cleaning pixels with respect to the original value of the pixel of interest. The neighborhood region of cleaning pixels and the value of the pixel of interest are then used to change the original value of the pixel of interest in the digital image so that it has been noise cleaned.

4 Claims, 2 Drawing Sheets

REMOVING CHROMA NOISE FROM DIGITAL IMAGES BY USING VARIABLE SHAPE PIXEL NEIGHBORHOOD REGIONS

CROSS REFERENCE TO RELATED APPLICATION

Reference is made to commonly assigned U.S. patent application Ser. No. 09/415,365 filed concurrently herewith, entitled "A Region Growing Based Noise Reduction Method For Digital Images" by Edward B. Gindele, the disclosure of which is incorporated herein by reference.

FIELD OF INVENTION

The present invention relates to providing smoothed digital images with reduced noise.

BACKGROUND OF THE INVENTION

One type of noise found in digital camera images appears as low frequency, colored blobs in regions of low spatial frequency, e.g., a person's face. These blobs, a type of chroma noise, produce a mottled appearance in an otherwise spatially flat region. These colored blobs are irregularly shaped and are typically 5 to 25, or more, pixels wide in a given direction.

There are numerous ways in the prior art for reducing chroma noise in digital images. Among these are numerous patents that describe chroma noise reduction methods using optical blur filters in digital cameras to avoid aliasing induced chroma noise in the first place. However, these blur filters generally address only high frequency chroma noise, and are generally ineffective against low frequency chroma noise.

Another very common approach to chroma noise reduction is to simply use standard grayscale image noise reduction techniques on each color channel of the image, in effect, treating each color channel as a separate grayscale image. By treating a full-color image as three, unrelated grayscale images, any interactions or correlations between the color channels are ignored. As discussed below, the inherent relationships between the color planes of a digital image can be used to perform more effective chroma noise cleaning, for example, by transforming the image into a different color space that permits for easier separation of image noise from genuine scene content.

Some approaches deal specifically with digital image processing methods for reducing or removing chroma noise artifacts. One class of digital camera patents discloses improvements to the color filter array (CFA) interpolation operation to reduce or eliminate high frequency chroma noise artifacts. Another class of patents teach using different pixel shapes (i.e., rectangles instead of squares) and arrangements (e.g., each row is offset by half a pixel width from the preceding row) with accompanying CFA interpolation operations to reduce or eliminate chroma noise artifacts. Again, these techniques address only high frequency chroma noise, and are generally ineffective against low frequency chroma noise.

There is the well known technique in the open literature of taking a digital image with chroma noise artifacts, converting the image to a luminance— chrominance space, such as CIELAB, blurring the chrominance channels and then converting the image back to the original color space. This operation is a standard technique used to combat chroma noise. One liability with this approach is that there is no discrimination during the blurring step between chroma noise artifacts and genuine chroma scene detail. Consequently, sharp colored edges in the image begin to bleed color as the blurring become more aggressive. Usually, the color bleed has become unacceptable before most of the low frequency, colored blobs are removed from the image. Also, if any subsequent image processing is performed on the image, there is the possibility of amplifying the visibility of the color bleeding. A second liability of this approach is that a small, fixed blur kernel is almost required to try to contain the problem of color bleeding. However, to address low frequency chroma blobs, large blur kernels would be needed to achieve the desired noise cleaning.

SUMMARY OF THE INVENTION

It is an object of the present invention to provide a chroma noise reduction method that permits for the use of large blur kernels while not causing color bleeding at sharp colored edges.

It is another object of this invention to provide an improved chroma noise cleaned digital image using variable shaped pixel neighborhood region blur kernels.

It is another object of the present invention to provide low frequency chroma blobs that can be removed from a digital image by using variable shaped pixel neighborhood region blur kernels.

These objects are achieved with a method for removing noise on a pixel by pixel basis from pixels of a digital image comprising the steps of:

producing a map of features in the digital image;

storing an original value of the pixel of interest from the map of features;

using values of features from the map to determine a variable shape neighborhood region of cleaning pixels with respect to the original value of the pixel of interest;

using the neighborhood region of cleaning pixels and the value of the pixel of interest to change the original value of the pixel of interest in the digital image so that it has been noise cleaned; and repeating the steps above for other pixels of interest.

The present invention overcomes the limitation of the "chroma blur trick" by first identifying all of the edges and boundaries in the image and then permitting each calculation neighborhood region to adaptively grow until it encounters an edge or boundary. Consequently, color bleed is avoided while still permitting the use of large area blurring operations to eliminate chroma noise artifacts.

Features of this invention include:

1) automated operation (no user intervention is required, although the user could be given access to some algorithm parameters to control the aggressiveness of image modification); and 2) locally adaptive, variable sized calculation neighborhood region (very low spatial frequency artifacts can be eliminated in flat regions without forcing the use of the same large calculation neighborhood region size in spatially busy areas).

A novel aspect of this invention is the use of a locally adaptive, variable sized calculation neighborhood region that keys off of an edge feature map to permit the maximum amount of chroma noise removal without significant degradation to genuine scene detail.

DETAILED DESCRIPTION OF THE INVENTION

Since noise cleaning algorithms for digital images are well known, the present description will be directed in particular to elements forming part of, or cooperating more directly with, apparatus and method in accordance with the present invention. Elements not specifically shown or described herein may be selected from those known in the art. Although the present invention will be described in relation to a digital image produced by an electronic camera, it will be understood by those skilled in the art that the present invention is not limited to such image product devices and can use original digital images from other sources.

Figure 1:
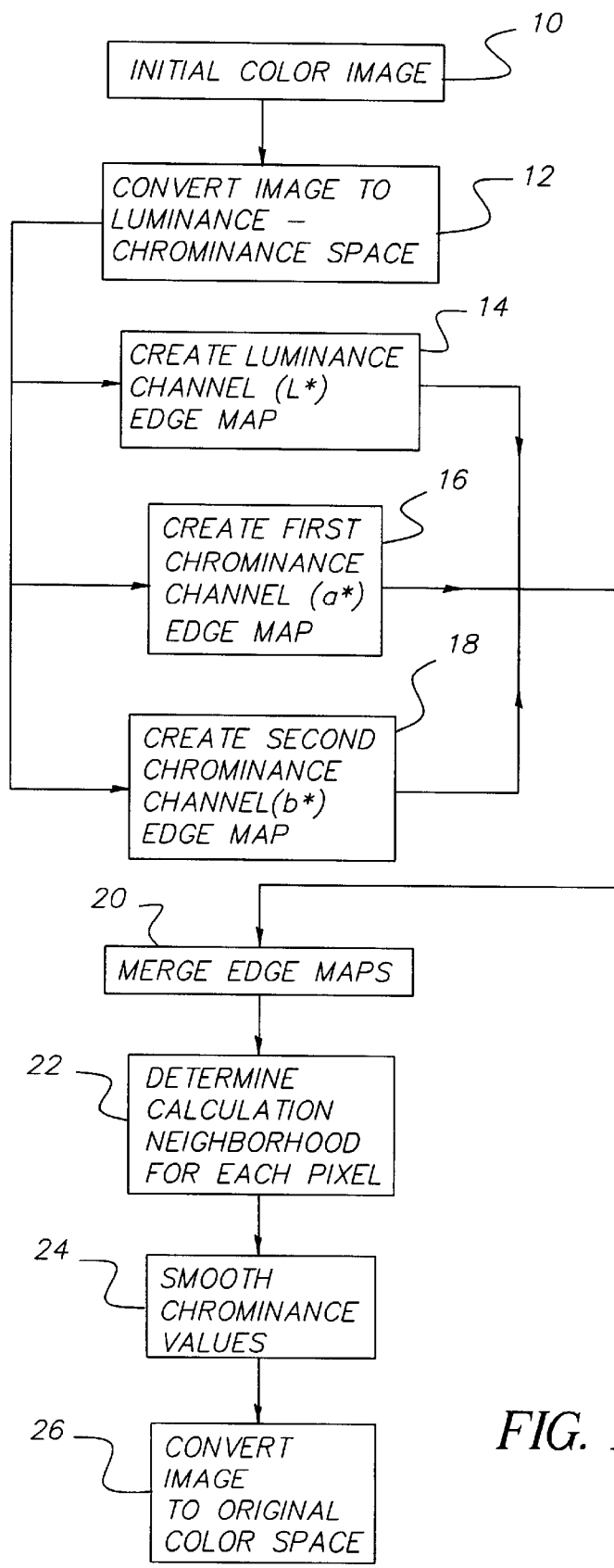
FIG. 1 is a block diagram of the processing flow for practicing the present invention to produce improved digital images.

Referring to FIG. 1, block 10 is the original image. In block 12 the image is converted to a luminance—chrominance space, such as CIELAB. Although CIELAB is the preferred color space, other color spaces that can be used in accordance with the present invention will suggest themselves to those skilled in the art. Blocks 14, 16, and 18 create a map of features, or edge map, from the luminance—chrominance data. To create the map, four edge detector filters are convolved with each channel and the results summed to create the edge map. The four filters are "h" for horizontal, "v" for vertical, "s" for slash and "b" for backslash. If the channel image is f(x) and the resulting edge map channel is g(x), then we could say:

$$g(x)=|hf(x)|+|vf(x)|+|sf(x)|+|bf(x)|$$

where "x" is either the luminance channel, L*, or one of the chrominance channels, a* or b*, "**" is the two-dimensional convolution operation, and absolute values of the components are added together. The four edge detector kernels are 5×5 truncated pyramid filters that were chosen to provide some robustness when used with noisy data. Larger kernels could be used for even more noise suppression. The kernels used here are:

$$h = \frac{1}{13} \begin{pmatrix} 1 & 2 & 0 & -2 & -1 \\ 1 & 2 & 0 & -2 & -1 \\ 1 & 2 & 0 & -2 & -1 \\ 1 & 2 & 0 & -2 & -1 \\ 1 & 2 & 0 & -2 & -1 \end{pmatrix}$$

$$v = \frac{1}{13} \begin{pmatrix} -1 & -1 & -1 & -1 & -1 \\ 1 & -2 & -2 & -2 & -1 \\ 0 & 0 & 0 & 0 & 0 \\ 1 & 2 & 2 & 2 & 1 \\ 1 & 1 & 1 & 1 & 1 \end{pmatrix}$$

$$s = \frac{1}{13} \begin{pmatrix} -1 & -1 & -1 & -1 & 0 \\ 1 & -2 & -2 & 0 & 1 \\ -1 & -2 & 0 & 2 & 1 \\ -1 & 0 & 2 & 2 & 1 \\ 0 & 1 & 1 & 1 & 1 \end{pmatrix}$$

$$b = \frac{1}{13} \begin{pmatrix} 0 & -1 & -1 & -1 & -1 \\ 1 & 0 & -2 & -2 & 1 \\ 1 & 2 & 0 & -2 & -1 \\ 1 & 2 & 2 & 0 & -1 \\ 1 & 1 & 1 & 1 & 0 \end{pmatrix}$$

In block 20, the final composite edge map, "g", is created by summing together the three channel edge maps.

$$g=g(L^*)+g(a^*)+g(b^*)$$

Since the individual components are already all positive values, there is not need to use additional absolute value operations in conjunction with this summation.

From the features edge map, a threshold value is determined. Typically, for an initial estimate, one chooses a flat region of the image and calculates the standard deviation (stdv) of the edge map values in this region. Three times the standard deviation (3 stdv) becomes the threshold. If this algorithm is being run interactively, this threshold could be one of the knobs given to the user. If it is found that for a given application the threshold does not significantly change from image to image, the threshold can be determined once, off-line, and then left as a fixed value for future use.

Figure 2:
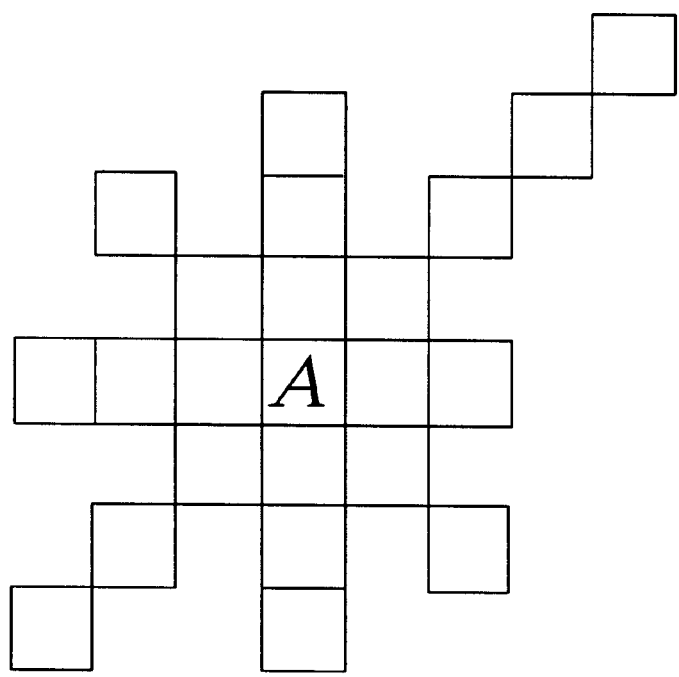
FIG. 2 is a typical variable shape pixel neighborhood region employed by this invention.

The chrominance channels, a* and b*, are now smoothed. In other words they are noise cleaned. In block 22, for each pixel in the image, the corresponding edge map value is taken to be the reference value. Then the algorithm moves out in each of the eight compass directions, N, NE, E, SE, S, SW, W, NW, one pixel at a time, examining the edge map values. If the difference between an edge map value and the reference value is less than the threshold, that pixel is added to the smoothing neighborhood region and the algorithm continues. Once an edge map value is reached that differs from the reference value by more than the threshold, the growth of the smoothing neighborhood region in that compass direction is stopped. FIG. 2 illustrates a typical smoothing neighborhood region after all compass directions have been examined. In this arrangement, eight directions are shown since there are eight contiguous pixels surrounding the pixel of interest. However, a contiguous neighborhood region is not a requirement of this invention. Note that this neighborhood region will be variable in shape and size. Returning to FIG. 1, within the smoothing neighborhood region, in block 24, the a* and b* channel values are averaged and these averages replace the a* and b* channel values for pixel A in FIG. 2. Each pixel in the image is processed in this way. In block 26, FIG. 1, the final image is converted back to the original color space.

The maximum possible direction of neighborhood region expansion in any given compass direction can be restricted to prevent huge neighborhood regions from being used in large flat regions. Such a maximum radius value might be in the range from 50 to 100 pixels.

The present invention can be embodied in a software program provided in a computer program product, having a computer readable storage medium having a computer program stored thereon for removing noise on a pixel by pixel basis from pixels of a digital image. The computer program performs the steps of:

(a) producing a map of features in the digital image;

(b) storing an original value of the pixel of interest from the map of features;

(c) using values of features from the map to determine a variable shape neighborhood region of cleaning pixels with respect to the original value of the pixel of interest;

(d) using the neighborhood region of cleaning pixels and the value of the pixel of interest to change the original value of the pixel of interest in the digital image so that it has been noise cleaned; and (e) repeating steps (a)–(d) for other pixels of interest.

The computer readable storage medium may comprise, for example, magnetic storage media, such as magnetic disks (such as a floppy disk) or magnetic tape; optical storage media such as an optical disk, optical tape or machine readable memory (RAM), or read only memory (ROM); or any other physical device or medium.

The invention has been described in detail with particular reference to certain preferred embodiments thereof, but it will be understood that variations and modifications can be effected within the spirit and scope of the invention. PARTS LIST 10 original image 12 color space conversion block 14 luminance edge map creation block 16 first chrominance channel edge map creation block 18 second chrominance channel edge map creation block 20 composite edge map creation block 22 pixel neighborhood region determination block 24 chrominance smoothing block 26 color space conversion block

What is claimed is:

1. A method for removing noise on a pixel by pixel basis from pixels of a digital image comprising the steps of:
   (a) producing a map of features in the digital image;
   (b) storing an original value of the pixel of interest from the map of features;
   (c) using values of features from the map to determine a variable shape neighborhood region of cleaning pixels with respect to the original value of the pixel of interest;
   (d) using the neighborhood region of cleaning pixels and the value of the pixel of interest to change the original value of the pixel of interest in the digital image so that it has been noise cleaned; and
   (e) repeating steps (a)–(d) for other pixels of interest.

2. The method of claim 1 wherein the neighboring contiguous pixels are disposed along predetermined directions which pass through the pixel of interest and the extent of the pixels along each direction are determined by the value of the features along such direction compared to the original pixel value.

3. The method of claim 1 wherein the neighboring contiguous pixels are disposed along predetermined directions which pass through the pixel of interest and the extent of the pixels along each direction are determined by the value of an edge along such direction.

4. A computer program product, comprising:
   a computer readable storage medium having a computer program stored thereon for removing noise on a pixel by pixel basis from pixels of a digital image for performing the steps of:
   (a) producing a map of features in the digital image;
   (b) storing an original value of the pixel of interest from the map of features;
   (c) using values of features from the map to determine a variable shape neighborhood region of cleaning pixels with respect to the original value of the pixel of interest;
   (d) using the neighborhood region of cleaning pixels and the value of the pixel of interest to change the original value of the pixel of interest in the digital image so that it has been noise cleaned; and
   (e) repeating steps (a)–(d) for other pixels of interest.

* * * * *